July 9, 1946.   E. B. NORMAN   2,403,678
COUPLING NOZZLE FOR AIR GREASE GUNS
Filed Dec. 16, 1943   2 Sheets-Sheet 2
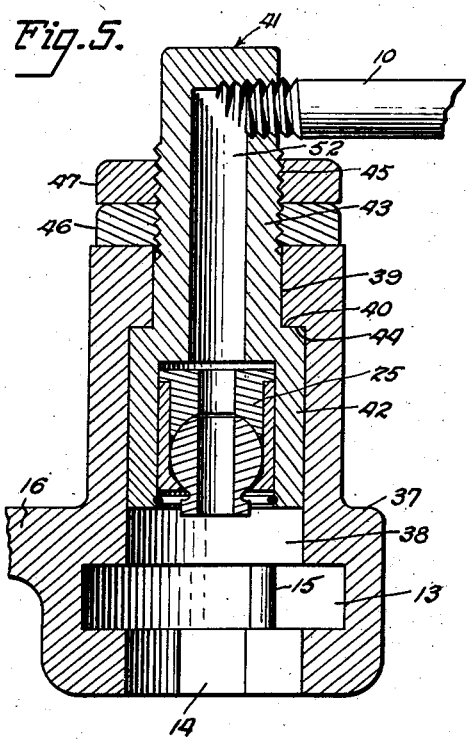
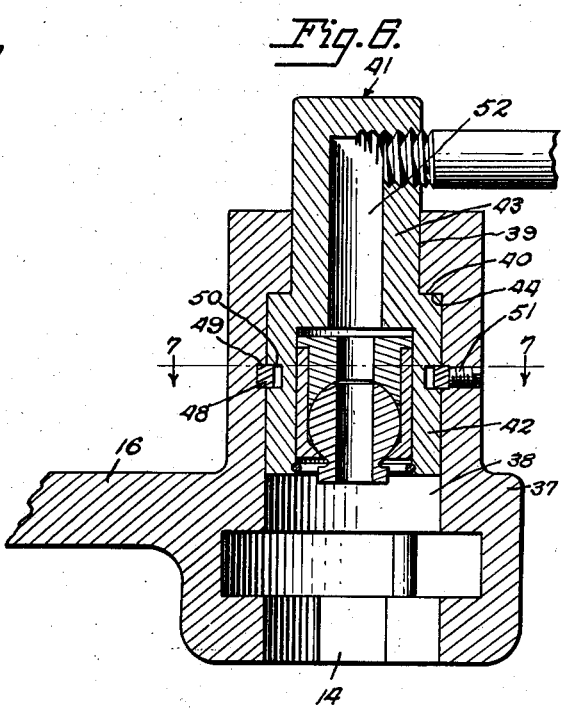
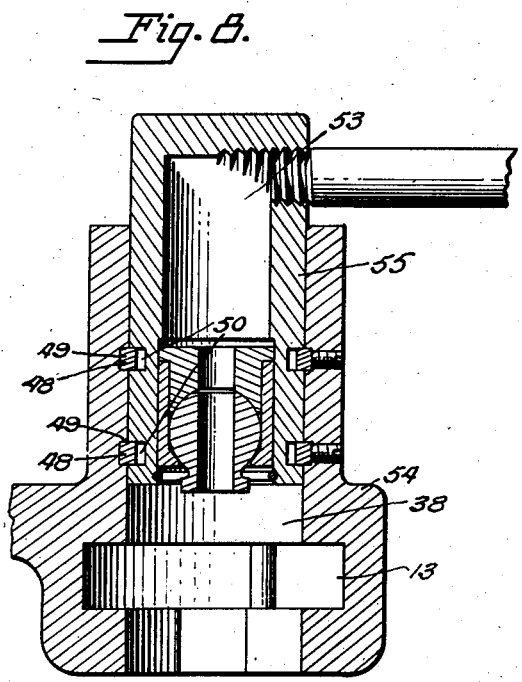
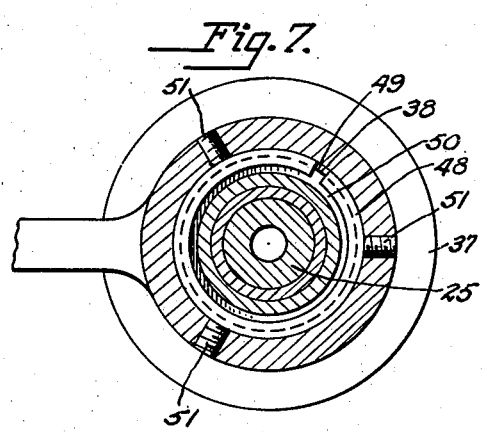
Inventor
E. B. Norman Patented July 9, 1946

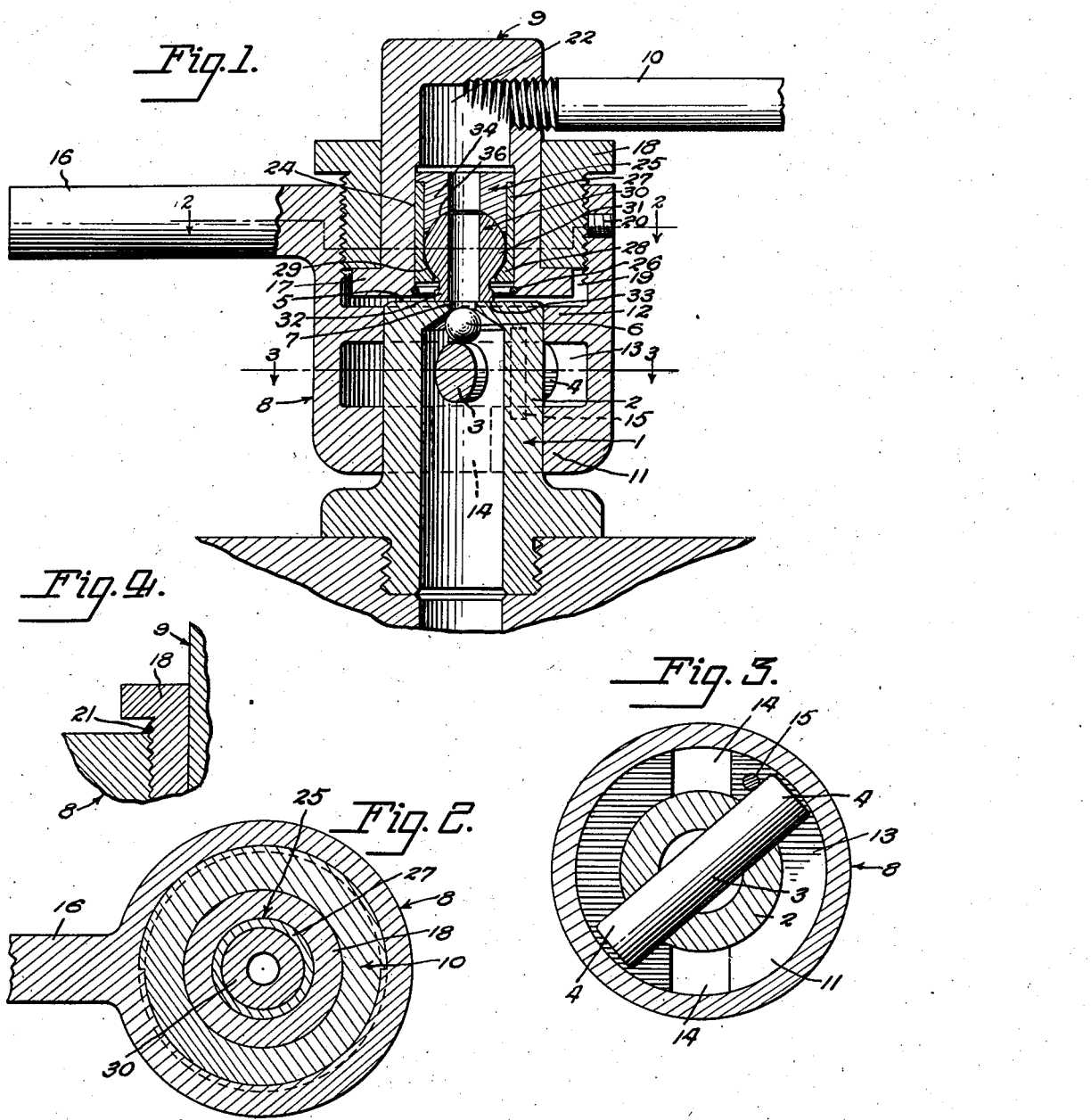

2,403,678

UNITED STATES PATENT OFFICE 2,403,678

COUPLING NOZZLE FOR AIR GREASE GUNS

Ernest B. Norman, New Orleans, La.

Application December 16, 1943, Serial No. 514,564

2 Claims. (Cl. 285—176)

This invention relates to a coupling nozzle for air pressure grease guns particularly designed to fit a filler neck of the type having a cylindrical body terminating in an end plane perpendicular to the axis of the body, and a transverse diametrical coupling pin having its ends extending beyond the body with a ball check between the pin and a central bore in the outer end.

It is common in the art to provide grease gun coupling nozzles for this type of filler neck, in which the pin extensions are engaged in inclined bayonet slots in the coupling member and tightened by wedging action obtained by rotating the coupling. This produces a wiping friction under pressure between the relatively movable parts of the filler neck and coupling, and results in rapid wear, particularly of the under sides of the pin extensions, and also of the walls of the bayonet slots and the end of the filler neck which engages the complementary surface of the coupling. When such wear becomes uneven or excessive, it is impossible to seal the joint between the coupling nozzle and filler neck against grease leakage.

The present invention has for its general object to provide a coupling nozzle in which no wedging force is employed in effecting the connection, the coupling nozzle and filler neck being relatively loose when fully coupled, so that no wiping friction under pressure has been engendered to produce undue wear between the parts, the seal being effected after connection, through pressure of the grease itself.

Another object of the invention is to provide, in a coupling nozzle of the type described, a grease seal having a limited universal movement through which an effective sealing joint is obtained, even though the end face of the filler neck, or the under sides of the pin extensions, or the parts of the coupling which engage the under sides of the pin extensions may not be in true parallel planes.

A further object of the invention is to provide a coupling having an inwardly extending terminal flange and an inwardly extending internal flange spaced from said terminal flange, said flanges defining coaxial cylindrical bores closely but freely surrounding the filler neck respectively below and above the pin extensions whereby the coupling is supported coaxially with respect to the filler neck, said flanges defining between them an annular channel of such width as freely to receive the pin extensions, the upper and lower walls of which are in planes perpendicular to the axis of said bores, there being diametrical recesses in the lower flange to let the pin extensions into said channel.

Another object of the invention is to provide a limit stop in said channel engageable by the pin extensions, so situated as to stop the coupling in position to be axially removed, in one direction of rotation of said coupling, and in fully engaged position in the opposite direction of rotation.

Still another object of the invention is to provide a coupling nozzle having the coupling member adapted to engage the filler neck, and the nozzle member adapted to be rigidly connected to a grease gun, said members being relatively rotatable so that the coupling member may be rotated to connect or disconnect it with respect to the filler neck while the gun is held in any fixed position.

Another object of the invention is to provide the nozzle member with a grease seal including a nozzle having a limited universal movement and a slight forward movement beyond the end of the nozzle member under initial grease pressure, said nozzle having a narrow annular planiform end adapted to sealingly seat upon a limited area of the outer end of the filler neck, surrounding the grease inlet aperture in the end of the filler neck.

Other objects of the invention will appear as the following description of a preferred and practical embodiment thereof proceeds.

In the drawings which accompany and form a part of the following specification, and throughout the several figures of which the same reference characters represent identical parts:

Figure 1 is an axial section through a coupling nozzle, embodying the principles of the invention;

Figure 28 is a cross-section taken along the line 2—2 of Figure 1;

Figure 3 is a cross-section taken along the line 3—3 of Figure 1;

Figure 4 is a sectional view in detail illustrating a slightly modified form of the invention;

Figures 5, 6 and 8 are axial sectional views through respective modifications of the invention;

Figure 7 is a cross-section taken along the line 7—7 of Figure 6.

Referring now in detail to the several figures, and first adverting to that form of the invention shown in Figures 1 to 4, inclusive, the numeral 1 represents in general a filler neck of the type to which the coupling nozzle of the subject invention particularly appertains, having a cylindrical body 2, a diametrical coupling pin 3 having the end extensions 4 beyond the body, and having an end face 5 which is perpendicular to the axis of the filler neck.

A ball check 6 is retained between the pin and the restricted grease inlet aperture 7 in the end of the filler neck. The subject invention has in particular contemplation the lubrication of locomotives, and the filler neck 1 is of the type and size generally present in locomotive lubricating systems.

The coupling nozzle comprises essentially two relatively rotatable parts, the coupling member 8, which connects to the filler neck, and the nozzle member 9, which connects to a grease gun 10 under air pressure. The coupling member 8 has the form of a bowl having an inwardly extending terminal flange 11 and a spaced interior flange 12 at an intermediate point. Said flanges are spaced apart to form an annular channel 13 having its upper and lower walls in planes perpendicular to the axis of the bowl and being of such width as to freely receive the pin extensions 4. The flanges 11 and 12 define cylindrical bores coaxial with the coupling bowl 8, adapted to closely but freely surround the body of the filler neck, by means of which the bowl is supported coaxially of the filler neck. The terminal flange 11 has the diametrical recesses 14 of such width as to let the pin extensions 4 into the channel 13.

The bowl is provided with a stop pin 15 intersecting the channel 13 adjacent one of the recesses 14, and spaced from the adjacent wall of said recess by a distance somewhat less than half the diameter of the pin extensions 4, so that when the coupling member 8 is rotated to its limit in one direction, it can be released from the filler neck by axial movement toward the end of the filler neck. When at its limit of rotation in the opposite direction, it is fully connected. It will be noted that since the slot 13 is perpendicular to the axis of rotation of the coupling member, it asserts no wedging pressure against the pin extensions, but embraces them freely throughout its entire range of rotary movement.

The coupling member 8 is preferably provided with a handle 16. The nozzle member 9, as shown, comprises an inverted cup-shaped fitting positioned within the upper part of the coupling bowl above the internal flange 12. The lower part of said nozzle member has an outwardly extending base flange 17. The coupling bowl is preferably internally threaded at its upper end, and receives a threaded ring nut or follower 18, the lower end of which defines with the internal flange 12 a channel 19, in which the outwardly extending flange 17 is rotatably retained. The ring nut 18 affords a means of adjusting the width of the channel 19, which should normally be just wide enough to permit free rotation of the nozzle member 9. The adjustment may be fixed either by means of a set screw 20, shown in Figure 1, or permanently fixed by means of a spot weld 21 between the ring nut and coupling bowl, as shown in Figure 4, or the ring nut may be of such depth that when it is screwed inwardly to its ultimate position, the proper clearance is established.

The nozzle member 9 is preferably connected rigidly to the barrel of the grease gun 10, so that the weight of the grease gun can be supported on the filler neck, relieving the operator.

The nozzle member 9 is provided with a grease seal 25 comprising a cylindrical bushing 27 having its lower end restricted by an annular shoulder 28, with an upwardly sloping interior wall 29. Said bushing contains a nozzle 30 having a ball-shaped portion 31 which rests upon the shoulder 28, and a neck 32 extending through the restricted opening in the lower end of the bushing with lateral clearance, and terminating in a planiform end face 33. The nozzle 30 is retained in the bushing 27 by means of a cylindrical plug 34 which, as shown, has a pressed fit with the bushing 27. The lower end of the plug 34 has a spherical seat 36 corresponding to the curvature of the ball-shaped portion 31 and fitted to the ball-shaped portion with sufficient clearance to permit the nozzle 30 to have freedom of universal movement. The plug 34 is preferably provided with an outwardly extending flange at the top, which abuts the top of the bushing 27 and acts as a stop to limit the intrusion of the plug within the bushing in the act of assembling the seal. The plug and nozzle have a bore therethrough opening in the planiform end face of the nozzle and communicating with the chamber 22 of the nozzle member 9.

The bushing 27, and with it the entire grease seal as a unit, is slidable in an enlarged counterbore 24 in the nozzle member 9, being retained therein by an expansible ring 26 seated in an annular groove in the bushing below the grease seal. When the nozzle is in its lowermost position in the bushing, the planiform end face 33 extends below the plane of the bottom end of the nozzle member 9.

In operation, when the coupling member is engaged with the filler neck, and grease is discharged from the gun into the chamber 33, the grease presses against the top of the plug 34, pushing the grease seal down relative to the coupling member 9 until the end of the nozzle contacts the end of the filler neck. If the planiform end face of the nozzle is not truly parallel to the end face of the filler neck, the nozzle tilts under pressure until there is an unbroken annular interface of contact between the nozzle and filler neck. Reactive pressure of the filler neck against the nozzle first lifts the coupling member into tight engagement with the pin extensions 4 of the filler neck, then forces the ball-shaped portion of the grease seal into sealing contact with the spherical seat 36, and applies sealing pressure to the interface between the nozzle and the end of the filler neck. All of these functions take place substantially simultaneously.

In those forms of the invention shown in Figures 5 to 8, inclusive, the coupling members, in those features which directly cooperate with the filler neck, are each similar to the first described modification, in that there is an uninclined channel 13 with parallel upper and lower walls for freely receiving the filler neck extensions 4, and with diametrical recesses 14 inward from the end for letting said extensions into the channel 13. Each has a stop pin 15 similarly located to that shown in the first described modification, an axial bore fitting the filler neck freely but closely, extending on both sides of the channel 13 for holding the coupling member coaxial with respect to the filler neck, and handle 16 for rotating the coupling member. Each coupling member is rotatably journaled on the nozzle member, the latter adapted to be rigidly connected to a grease gun 10 and including a grease seal 25.

These modifications differ from that first described in the mode of mounting the nozzle member relative to the coupling member and in such structural differentiation as attend said mountings.

In Figure 5 a form of the invention is shown in which the filler neck fitting bore 38 is extended into the upper part of the coupling member 37 and meets a counterbore 39 of smaller diameter extending downwardly from the upper end of the coupling member, defining a downwardly facing shoulder 40.

The nozzle member 41 is of cylindrical shape, having a lower part 42 fitting the bore 38 and an upper portion 43 of reduced diameter fitting the counterbore 39. An upwardly facing shoulder 44 is thus defined which engages the shoulder 40 and retains the nozzle member 41 against displacement in an upward direction under the stress of grease pressure.

The upper portion 43 of the nozzle member extends beyond the upper end of the coupling member and is provided with a threaded zone 45 upon which a nut 46 with lock nut 47 are screwed, so as to rest lightly upon the upper end of the coupling member, permitting rotation of the coupling member relative to the nozzle member but inhibiting downward endwise displacement of the nozzle member. In assembling this form of coupling nozzle, the nozzle member 41 is inserted from the lower end.

Referring now to that form of the invention shown in Figures 6 and 7, this differs from the modification shown in Figure 5 chiefly in that the nut and lock nut 46 and 47 are dispensed with and substituted by an expansible ring 48 seated in matching channels 49 and 50 formed on the adjacent cylindrical faces of the coupling and nozzle members. The ring 48 in this form of the invention performs the sole function of preventing downward endwise displacement of the nozzle member. In the event that it should ever be desired to disassemble this coupling nozzle, set screws 51 accessible from the outside of the coupling member are provided in the zone of the split ring, which engage said split ring and may be screwed inwardly to contract said split ring into the channel 50 and permit the withdrawal of the nozzle member.

In both those forms of the invention shown in Figures 5 and 6 the diameter of the lower part of the nozzle member is limited but the diameter of the bore 38, which has the same diameter as the filler neck and the upper part 43 of the nozzle member, is necessarily of smaller diameter than the lower part in order to provide the shoulder 44. This means that the grease conduit 52 must be of relatively small diameter. Since it is of advantage in grease guns of this type to have the grease passage through the gun nozzle member as large as possible, the form of invention shown in Figure 8 has been devised to provide a grease passage 53 of large diameter. In this form of the invention the filler neck fitting bore 38 extends through the coupling member 54 throughout the full length thereof and the nozzle member 55 is of uniform diameter throughout, rotatably fitting the bore 38. The nozzle member is retained within the coupling member by means of one or more expansible rings 48 seated in the matching slots 49 and 50 formed respectively on the adjacent cylindrical walls of the coupling member and nozzle member. In this form of the invention the expansible rings are called upon to withstand the stress of grease pressure in preventing relative endwise separation of the coupling and nozzle members and it is in view of the fact that an enormous pressure per square inch is developed in grease guns of this type that the use of more than one expansible ring is contemplated if necessary. In this form of the invention, as shown in Figures 6 and 7, set screws 51 may be provided in the zone or zones of the expansible rings for contracting said rings to permit separation of said members.

While I have in the above description disclosed what I believe to be preferred and practical forms of the invention, it will be understood to those skilled in the art that the specific construction and arrangement of parts as illustrated and described is by way of example and not to be construed as limiting the scope of the invention which is defined in the appended claims.

What I claim as my invention is:

1. In a coupling nozzle for filler necks of the type having a cylindrical body, a transverse end face with axial grease inlet and diametrical transverse coupling extensions, a coupling member adapted to be loosely coupled to said filler neck and a nozzle member retained by said coupling and freely rotatable relative thereto adapted to be connected to a grease gun, a grease seal carried by said nozzle member adapted to tighten the coupling connection between said coupling member and filler neck and to make sealing contact with the end face of said filler neck responsive to grease pressure, comprising a cage slidable in said nozzle member, having a longitudinal bore therethrough, a nozzle having a ball portion retained in said cage with a neck portion having a planiform end face extending through the lower end of said bore with lateral clearance, said nozzle having a bore therethrough opening into said planiform end face and communicating with the nozzle member through said cage, the latter having a spherical seat above said ball portion normally freely engaging said ball portion to permit universal movement thereof, but tightly engaging said ball portion under grease pressure.

2. Coupling nozzle for grease guns comprising a coupling member and a nozzle member coaxially related and relatively rotatable, said nozzle member being mounted in the upper end of said coupling member, said nozzle member having an axial cylindrical chamber opening in its lower end, means adapted to connect the upper end of said chamber to a grease gun, a grease seal slidably fitting in the lower part of said chamber comprising a two-part hollow piston subject to grease pressure from the upper part of said chamber, each part having a seat for a ball and there being lost motion between said parts, a nozzle with limited uniform movement comprising a ball portion within said piston engaged on opposite sides by the ball seats on said piston parts, and a mouth portion extending beyond the lower end of said nozzle member having a planiform end adapted to engage and move into flat contact with the end of a filler neck, a bore through said nozzle and piston communicating with the part of said chamber above said piston, said coupling member having an axial filler neck receiving bore opening in juxtaposition to the lower end of said nozzle member, having a filler neck pin receiving channel surrounding said bore and open thereto with its upper and lower walls in planes perpendicular to the axis of said bore, and having longitudinal pin passages extending from its lower end to said channel.

ERNEST B. NORMAN.